United States Patent [19]

Pobst, Jr. et al.

[11] 4,250,145
[45] Feb. 10, 1981

[54] CARBON BLACK REACTOR WITH IMPROVED BURNER

[75] Inventors: David F. Pobst, Jr., Big Spring; Jesse M. Bailey, Jr., Odessa, both of Tex.

[73] Assignee: Sid Richardson Carbon & Gasoline Co., Fort Worth, Tex.

[21] Appl. No.: 913,833

[22] Filed: Jun. 8, 1978

[51] Int. Cl.³ .................. C09C 1/00; C09C 3/00
[52] U.S. Cl. ................... 422/151; 422/158; 423/450
[58] Field of Search .............. 422/150, 151, 158; 239/550, 556, 557, 558, 559, 568, 554, 555; 431/178, 177, 174, 171, 346; 423/449, 450, 458

[56] References Cited

U.S. PATENT DOCUMENTS

| 1,717,667 | 6/1929 | Curran | 431/171 |
| 1,902,753 | 3/1933 | Beaver | 239/568 |
| 2,144,971 | 1/1939 | Heller et al. | 422/150 |
| 2,238,576 | 4/1941 | Heller et al. | 423/458 |
| 2,594,914 | 4/1952 | Grosskloss | 431/171 |
| 2,621,722 | 12/1952 | Abrams | 239/555 |
| 2,625,994 | 1/1953 | Shepherd et al. | 239/555 |
| 2,652,313 | 9/1953 | Loving | 423/450 |

Primary Examiner—William F. Smith
Assistant Examiner—Chris Konkol
Attorney, Agent, or Firm—Vinson & Elkins

[57] ABSTRACT

An improved carbon black process burner is disclosed which finds its preferred use in reactors for forming carbon black by the thermal decomposition of liquid hydrocarbons. The burner combusts a pre-mixed blend of fluid fuel and oxidant gas and is characterized by a flame holder having a plurality of elongated parallel orifices which produces improved combustion by inducing optimum recirculation between spaced parallel fluid jets of premixed fuel and oxidant gas issuing through the orifices. This abstract is not to be construed in any way to define or limit the invention set forth below.

13 Claims, 20 Drawing Figures

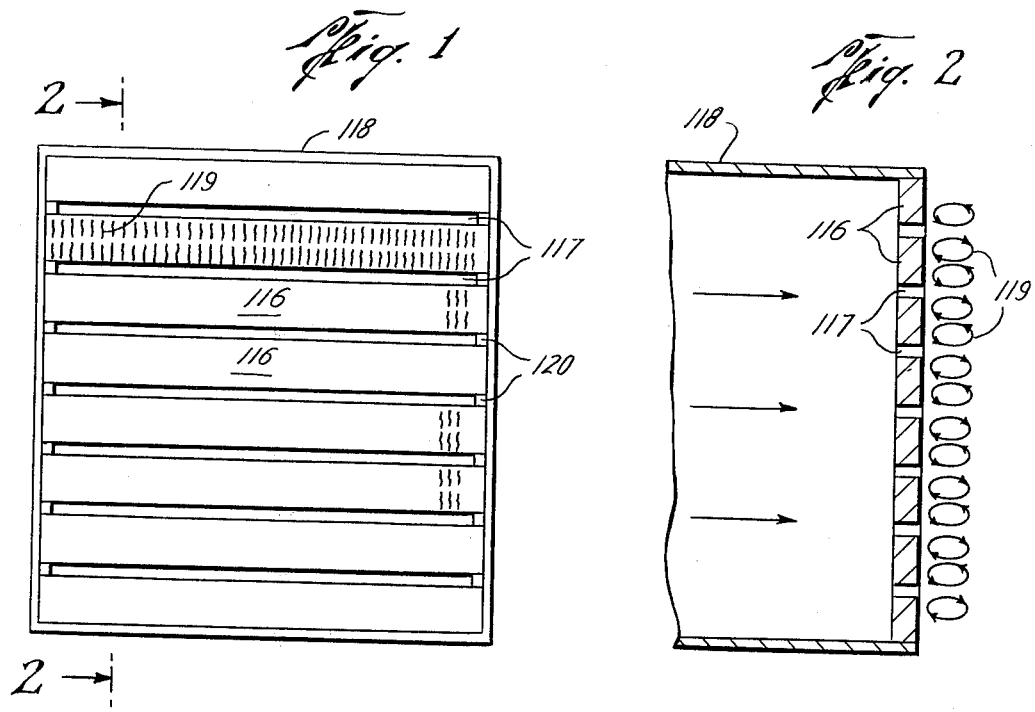
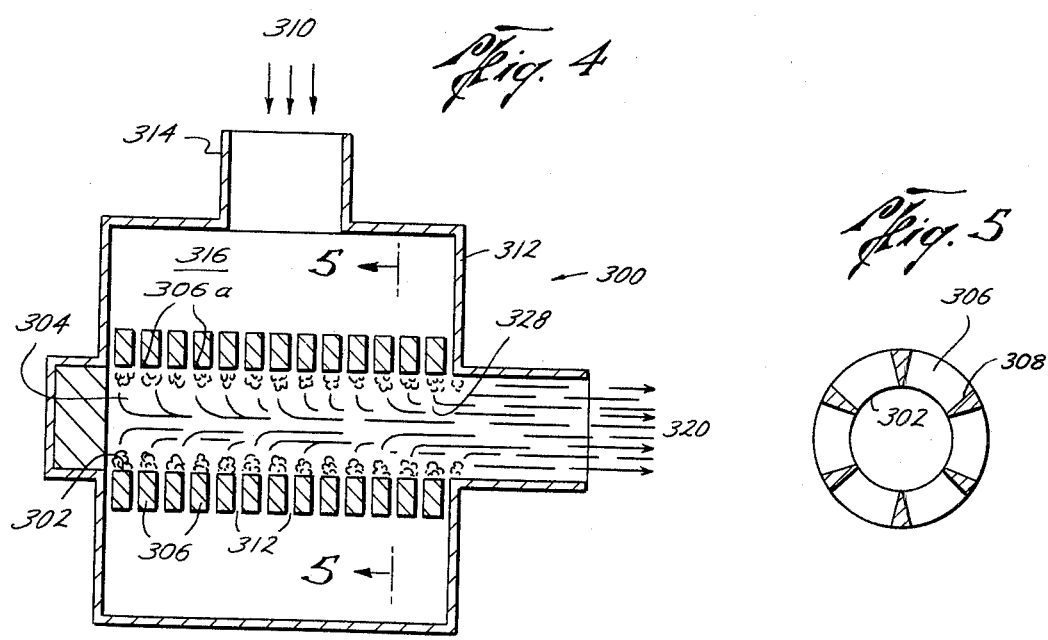

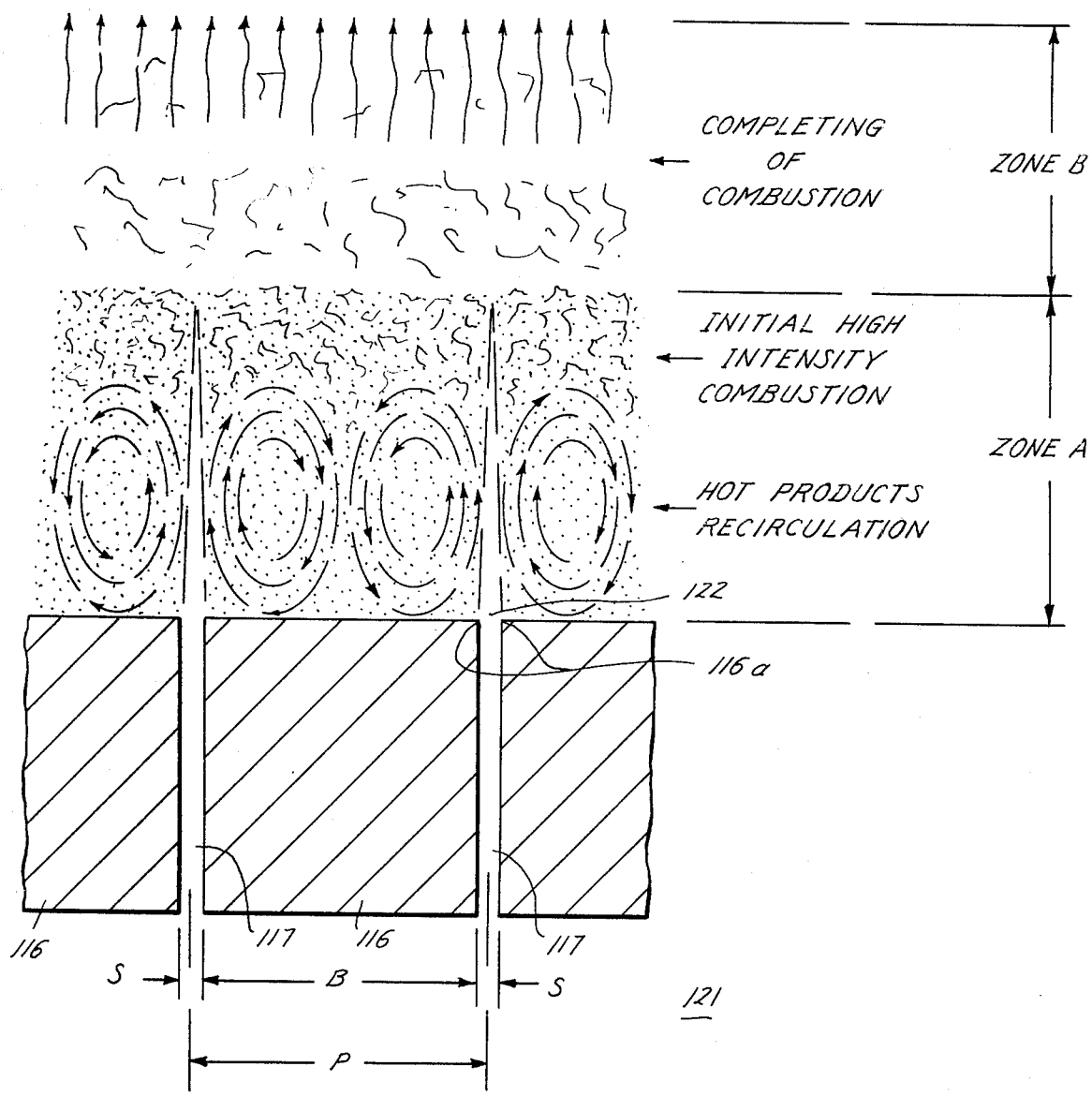

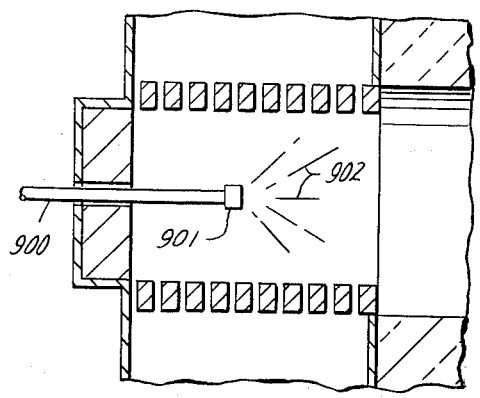
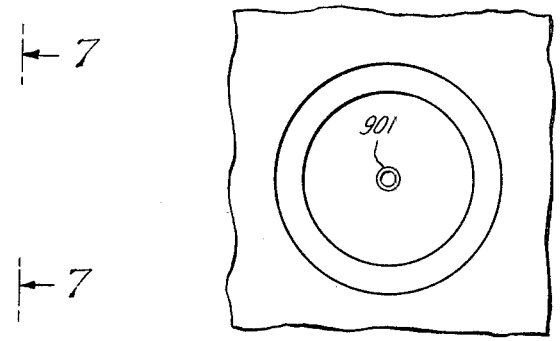
Fig. 6          Fig. 7
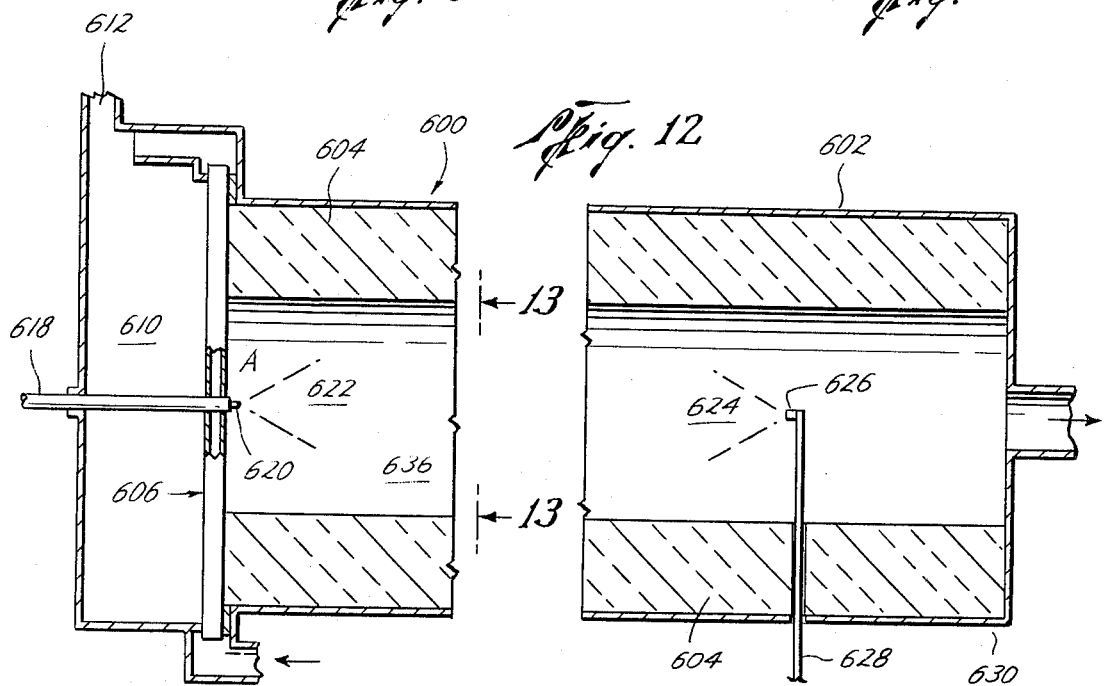
Fig. 12
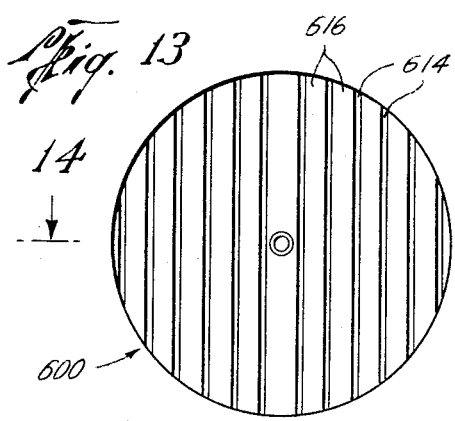
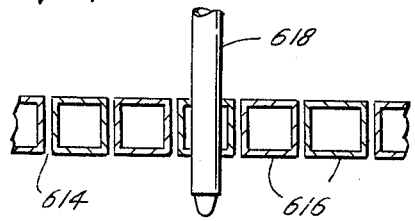
Fig. 13          Fig. 14

CARBON BLACK REACTOR WITH IMPROVED BURNER

BACKGROUND OF THE INVENTION

1. Field of the Invention

The present invention relates to apparatus and process for making carbon black using slotted premix burners of a type not heretofore used in this field.

Flames are commonly characterized as premixed, or non-premixed, depending upon whether the fuel and oxidant have been blended into a substantially uniform mixture before being ignited. A substantially uniform mixture is defined as encompassing the mixtures of gaseous fuel with gaseous oxidant, vapors of normally liquid fuels with gaseous oxidant, and atomized droplets or mists of liquid fuels with oxidant gas. The art of premix burner design and operation is distinguished from that of non-premix burners in that with premix burners, (1) special attention must be given to the ranges of stability because of the dangers of "flashback", (2) it is necessary to cool the burner, or make it of ceramics or other highly refractory material since premix flames are inherently faster developing than non-premix flames, and (3) the shape of the flame must be controlled so that its intense heat is directed so as to avoid damage to associated equipment and to concentrate the heat where it is useful.

The stability of flame is a matter of great practical concern. If the flowing velocity of the reactants is too great, the flame becomes detached, or "blows off" and may be extinguished. Where the velocity of the oncoming combustible premix is marginally too high, the flame base may oscillate and be unstable. If on the other hand a premixed flame is fed at too low a velocity, the flame may "flash back" into the mixing zone upstream of the burner, causing overheating of the burner, and possibly a dangerous explosion. When the characteristics of the combustion system are such that the differences between blow-off and flashback conditions are too narrow, it is difficult to operate efficiently and safely. Therefore, a system is preferred which is versatile, that is, one which has a wide range between blow-off and flashback conditions.

The velocities of blow-off and flashback will vary with the temperature of the fuel-oxidant mixture, the ratio of fuel to oxidant, and the chemical character of the fuel itself, including its composition and its heat content. The relationship of air/fuel ratio to the velocities of blow-off and flashback are of special interest in the manufacture of carbon black, since the air/fuel ratio is a major variable in process control in this field.

To attain the objectives of controlled burning, it is necessary to consider the fundamentals of flame propagation. M. W. Thring, in *The Science of Flames and Furnaces,* John Wiley and Sons, disclosed there are essentially five mechanisms that may be used for igniting an inflowing combustible premix. These are conduction of heat, diffusion of hot species, preheat, radiation of heat, and recirculation of hot products from the downstream zone of fully established combustion to the point of ignition. The first four, individually and together, may permit stabilizing flame propagation of common premixtures such as methane and air with inflowing premix velocities in the low to medium range of about 1.5 to 30 feet per second. If a similar flame is to be held at velocities an order of magnitude higher, ignition will require the recirculation of hot products. Such higher velocities commonly occur in industrial burners.

It is well known that a non-streamlined body placed in a flowing fluid will generate recirculating flow downstream of the body and behind it. The recirculation is generated only against the surface of the non-streamlined body in the flow, along a line described as the intersection of the farthest laterally projecting edge of the body with a plane normal to the direction of flow. This line becomes the locale of the transfer of heat and chemically active species if used as a flame-holder in a combustor; it becomes, in effect, a "line of ignition" because the recirculation turns behind the interrupting body as the flow advances downstream, reverses direction, and reenters the flow near the surface of the intruding body, bringing with it the heat and chemically active substances necessary for igniting the oncoming fuel. As a result, the overall character of combustion as a system will depend significantly upon the ratio of the length of the "line of ignition" to the mass of flowing reactants. The ratio of the total length of the "line of ignition" to the mass of reactants flowing through the system is determined by the arrangement and number of non-streamlined devices placed in the stream for a given mass rate. For comparisons among burners, it becomes logical to use the ratio of the total length of line of ignition to the cross-sectional area of the orifices, or area of flow, with velocity as a parameter.

In one aspect, the present invention is related to the arrangement of the apparatus of a burner which makes it possible and practical, in a simple manner, to control the ratio of the length of "line of ignition" along non-streamlined bodies placed in the path of premixed combusting reactants to the mass of the flowing reactants, while retaining the proper spatial relationships downstream of the non-streamlined bodies to accommodate the recirculation eddies.

The invention is also concerned with the interactions of parallel flames, hereinafter discussed in connection with the slot to pitch ratio.

Another aspect of the invention is the simplifying of apparatus for producing high fineness carbon blacks by removing the necessity for separate combustion and reaction zones without losing the desired quality of the product.

Another aspect of the invention is improved adaptability of burners to variations in the characteristics of the combustion mixture.

Yet another aspect of the invention involves the adaptability of the burners of the invention in the manufacture of furnace carbon black by controlling the shape of the flame.

According to another aspect, the invention relates to the use in carbon black manufacture of premix slotted burners which efficiently remove back-radiated heat from the burner elements through the cooling effect of the inflowing premix, thereby permitting the burner elements to be made of low cost metal rather than more expensive refractory material.

There are two general categories of furnace carbon black used in the automotive tire industry: the so-called soft blacks, such as those used in tire carcasses; and the blacks which impart high abrasion resistance to rubber used in tire treads, commonly known in the trade as "tread blacks". The tread blacks are much finer than the carcass blacks, that is, the particles are much smaller. The typical soft, or carcass, black may have a surface area of thirty or forty square meters per gram. These blacks are made at low velocities and high ratios of oil to flowing gases. Blacks of the tread grades may have surface areas of from sixty to one-hundred-fifty square meters per gram, or even more. Tread blacks are made at higher velocities and lower ratios of oil to flowing gases than the carcass blacks. In recent years there has been a tendency to make the tread grades finer to allow more surface area for the interaction of the carbon and the rubber.

In the conventional furnace process for manufacturing carbon black, the hydrocarbon fluid fuel, commonly natural gas or fuel oil, is burned in a stream of process air furnished by a blower. The hot gases produced by the combustion of the fuel flow through a vessel, usually lined with refractory, and ordinarily of circular cross section. A feedstock oil, preferably highly aromatic, which is the chief source of carbon in the system, is injected into the flowing hot gases downstream of a point where the combustion of the fuel is complete. The oil feedstock must be vaporized as one step in the carbon forming process in order for the process to be successful. Vaporization is favored by high velocity of the hot gas stream, a high degree of turbulence, high temperature, low concentration of the oil, and high degree of atomization of the oil.

The feedstock oil vapor is carried by the hot gases formed by the combustion of the fuel, the fuel gases attaining temperatures of from about 2400° F. to 3400° F., varying with the methods used for controlling combustion. Radiant heat from the refractory, heat directly transmitting by the hot gases, high shear and mixing in the hot gases, and combustion of a portion of the oil by residual oxygen in the products of combustion all combine to transfer heat very rapidly to the feedstock oil vapors. Under these conditions, the oil molecules are cracked, polymerized and dehydrogenated, and progressively become larger and less hydrogenated until some reach a state such that they may be called nuclei of carbon. The nuclei grow in size, and at some stage there is aggregation of particles to form cluster-like agglomerates, known in the industry as "structure". At the completion of the process, the hot gases containing the carbon black are quenched to a temperature low enough to stop the reactions, and to allow the carbon black to be collected by conventional means.

The ultimate size of the particles depends, among other things, upon the concentration of the material from which they form. It is well-known, for example, that with a given furnace process, increasing the ratio of vaporized feedstock oil to the mass of flowing hot gases will produce larger particles and vice versa.

Several means have been devised by the industry for increasing the ratio of feedstock oil to the mass of hot flowing gases without losing fineness; that is, to maintain small particle size in spite of an increase of the ratio of feedstock oil to combustion gases. One method is to preheat the air furnished to the combustion zone, so that the addition of heat allows the rapid cracking of more oil. Another device is to increase the velocity of the flowing hot gases by a constriction in the reactor. This technique has been empirically established as a means of making small particle size, and is almost universally practiced in the manufacture of tread grade carbon blacks. High velocity, however, in conjunction with the high temperatures of the process, leads to problems of refractory deterioration in the constriction. Those skilled in the art are aware that only a little damage to the constriction is required to cause quality deterioration in the product.

Besides particle size, an important property of the tread grades of carbon black is what is known in the trade as "structure" discussed above. In the electron microscope, carbon black will appear as clusters of minute, imperfectly shaped spheroids fused together. The degree of clustering is called structure, and it is measured by a standard test of the American Society for Testing and Materials, Method D2414-72. In the test, the carbon absorbs dibutyl phthalate while being stirred in a standard mixing chamber until the torque on the mixing blades, generated by adding the dibutyl phthalate oil to the black, reaches a predetermined value. The greater the volume of dibutyl phthalate required to be mixed with the black to reach the torque prescribed, the greater the structure. This test is referred to as DBP absorption.

Structure may be classified as "temporary" or "permanent". When carbon black is first produced, it is a fluffy powder, with a high DBP value. Mechanically working the fluffy, high DBP carbon black causes some of its structure to break down. For example, a carbon black sample may have a DBP absorption value of about 130 when produced; then, when the pelleting machines work it into pellets for commercial use, the DBP absorption value may fall to about 115. More mechanical work on the carbon black will decrease its DBP value even further, until a point is reached at which further mechanical work done on it reduces the DBP absorption value insignificantly. A test referred to commonly as "24M4 DBP" is used to represent "permanent" structure, approximating the effects of milling the carbon black in rubber. The test is the DBP absorption on blacks which have been crushed four times at a pressure of 24,000 psi. It is published by the American Society for Testing and Materials as "Proposed Method B of D2414-72".

Another property of tread blacks which is significant as to its quality is porosity. Porosity is usually estimated by comparing the surface area of the carbon black measured by the adsorption of a small molecule with the surface area measured by a larger molecule. The rationale of the comparison is that the smaller molecule can make its way into pores or crevices in the surface which cannot be penetrated by larger molecules. Thus, if the two measurements are close together, there is relatively little porosity; but if they are far apart, there is more porosity. A surface which is less porous is more desirable in blacks to be used in the compounding of tread rubber.

Two commercial methods for measuring surface area are by nitrogen adsorption, standardized by the American Society for Testing and Materials as Method D-3037-76, and by iodine adsorption, standardized by the ASTM as method D-1510-76.

Another adsorption method for measuring surface area uses hexadecyltrimethylammonium bromide (abbreviated CTAB) which has a molecule too large to enter micropores which are accessible to nitrogen molecules. One porosity measure, then, is the nitrogen surface area minus the CTAB surface area. The smaller the difference, the less the porosity of the surface.

In addition to the adsorptive methods of estimating the fineness of carbon black, a tint test may be used. The tint test is a method of measuring the ability of a carbon black to cover the surface of a finely divided zinc pigment as compared to a standard carbon black. The method is standardized by the American Society for Testing and Materials, and is published as Method Number D-3265-76. The results of the test are such that higher numbers indicate greater fineness and vice versa.

2. Description of the Prior Art

The use of parallel slots in premix burners is known. U.S. Pat. No. 1,045,473 to Van Zandt, shows an externally fired cylinder with parallel slots for burning a premix of fuel gas and air, but with beveled edges on the pieces separating the slots, a practice contrary to the teachings of the present invention. U.S. Pat. No. 1,245,346 to Humphrey portrays a group of small slot burners spaced apart in such manner as not to be adaptable to the practice of the present invention. U.S. Pat. No. 1,717,667 to Curran claims parallel slots formed by ceramic pieces which are operated at high enough temperature to be thermal igniters, and secondary slots so oriented as to form a swirling combusting mass. Both of these techniques are contrary to the teachings of the present invention. The device of Geurink et al described in U.S. Pat. No. 1,830,393 is only partially a premix burner, as indicated by lines 14 ff., page 1, first column, and lines 23 ff., where the shape of the transverse channels is said to be designed to induce the inflow of secondary air. A slotted conical shape is portrayed in U.S. Pat. No. 2,018,582 to Theunissen, in which secondary air only, without gas, enters through the slots of the cone into a mixture of primary air and fuel gas. This sequence of admixing for combustion is contrary to the teachings of the present invention. The burner of Jaye, described in U.S. Pat. No. 2,573,144 is designed to entrain secondary air (col. 1, lines 26 ff.), and the patent teaches the apparatus for producing a bifurcated flame, and the advantageous use thereof. This patent also teaches a slot/pitch ratio of from 0.091 to 0.200 (col. 2, lines 9 ff.), while the present invention teaches the advantage of lower ratios. U.S. Pat. No. 2,621,722, line U.S. Pat. No. 1,045,473, teaches the use of an externally fired cylinder. U.S. Pat. No. 2,788,848 to Furczyk describes ceramic plates used to form slots, into which funnel shaped recesses are made for the mixing of the fuel and air. U.S. Pat. No. 3,035,633 to Palko describes an externally fired frusto-conical shape supplied with oil vapors from an evaporator which is an integral part of the burner, and with air premixed with the vapors. U.S. Pat. No. 3,277,948 to Best portrays a slotted burner, the ceramic elements of which form the slots, designed to operate with the ceramic elements at incandescence, contrary to the present invention, one advantage of which is the cooling of the parts which form the slots. In FIG. 2 of Hine's U.S. Pat. No. 3,285,317 the slots are shown as discontinuous; and the burner strip is dished to prevent resonance. Resonance under certain conditions is a characteristic of the burners of the present invention. In U.S. Pat. No. 3,361,367 to Hein et al the parallel slots are of unequal length and have no specified slot/pitch ratio. In this patent there is special provision for reducing the pressure at the ends of the burner to prevent blow-off, a clear indication that instability would be a characteristic of this arrangement of slots without the special provision.

The stabilizing of flames by various schemes which involve the inducement of recirculation, or the use of vortex motion, are known. One common method is to suddenly enlarge a cylindrical conduit carrying the combustible mixture to a larger diameter, producing a step in the wall which causes turbulent recirculation. Another scheme for flame stabilization is to create a swirl by the injection of a portion of the reactants tangentially, as illustrated by U.S. Pat. No. 3,187,799 to Nesbitt. Carried to its ultimate, the use of swirl is illustrated in U.S. Pat. No. 3,490,869 to Heller, in which the total mass of oxidant and fuel enters tangentially, forming one great vortex. It is noted in this case also, that the flame sweeps a hot refractory surface, taking advantage of surface effects. Spin vanes may be employed as in U.S. Pat. No. 3,254,846 to Schreter et al, and German Pat. No. 2418274, both of which treat of burning liquid fuel. A single deflector, which amounts to a non-streamlined body placed in the flow, may be used in U.S. Pat. Nos. 3,009,787 to Ruble, and 3,408,165 to Hinson. Another common technique is portrayed in British Pat. No. 1,359,216; a mixture of air and fuel gas passes through perforations, shown as circular, in a metal flameholder, the solid portions of which, between the perforations, act as non-streamlined objects in the path of the flow of combustion mixture. There are numerous instances of gas being injected through orifices or slots into air; for example Morgan's U.S. Pat. No. 3,614,283.

In the field of the use of burners for the production of furnace carbon black, typical assemblies are shown in the following U.S. Pat. Nos.: Deland 3,490,870; Latham 2,976,127; Krejci 2,865,717; Williams 3,060,003; Latham 3,256,065; Heller 3,490,869.

The doctrine and practice are well established in patents issued, and in the industry, that in the manufacture of high fineness carbon black the combustion zone and the reaction zone are separated. For example Wrigley in U.S. Pat. No. 2,780,529 shows in FIG. 1 what are characterized in column 2, lines 41-43 as a combustion zone and a reaction zone. Also, Heller in U.S. Pat. No. 3,490,869, column 2, lines 64 ff., discusses this subject.

In U.S. Pat. No. 3,026,185 Takewell et al state at column 2 line 23 ff that reducing a constriction diameter to half its original value increased the surface area of carbon black from 80 square meters per gram to 200 square meters per gram.

Latham in U.S. Pat. No. 3,256,065 discusses at column 1, third paragraph, the effects of turbulence in obtaining rubber reinforcing grades of carbon black. Turbulence is known to be a function of velocity. At column 2, lines 15 ff Latham states, "The advantages enumerated above are primarily realized by employing a Venturi section in a tubular carbon black reactor—." The primary effect of a Venturi is to increase greatly the velocity of flow. Numerous patents portray constrictions designed to increase velocity in carbon black reactors.

It is apparent that a new process and apparatus which is able to match the quality of carbon black from conventional process and apparatus at half or one-third the velocity required by the conventional process with other conditions essentially the same, is inherently different.

OBJECTS OF THE INVENTION

It is an object of this invention to provide a combustion apparatus adaptable to a wide range of operating conditions. Another object is to provide an apparatus capable of very high rates of heat release per unit of volume and of great adaptability, and which can be simply altered to accommodate different requirements as to fuel and intensity of combustion. An economic object of the invention is to provide a carbon black reactor with a burner which can be fabricated of metal parts, rather than refractory material, and still function without failure under conditions of intense combustion and radiation. A primary object of the invention is to provide a carbon black reactor with a burner capable of being shaped to fit many conditions of operation.

Still another object of the invention is to provide apparatus and process for producing carbon black of high fineness at lower velocities than required by conventional apparatus and process.

It is also a major object of the invention to provide a unique apparatus and process for the production of carbon black, characterized in several embodiments by the ability to produce extremely high-fineness carbon black with high structure. An additional object is to provide a system for the production of carbon black in which, contrary to accepted concepts, it is not necessary to physically separate the combustion zone and the reaction zone. Another object is to provide a system adaptable to the production of coarse carbon blacks.

DESCRIPTION OF THE DRAWINGS

These and other objects and advantages of the present invention will become apparent from the following drawings, specification, and claims. In the accompanying drawings, in which like numerals indicate like parts:

FIG. 1 is an elevational end view of a burner of the invention, with lines representing the flow pattern;

FIG. 2 is a sectional view taken along line 2—3 of FIG. 1;

FIG. 3 is an enlarged detail view in vertical cross-section of the flame-holding and combustion zones in a burner of this invention, illustrating the mechanics of flame propagation as they are believed to exist in burners constructed according to the present invention;

FIG. 4 is a vertical sectional view of an internally fired cylindrical burner constructed in accordance with this invention;

FIG. 5 is a view in vertical section along line 5—5 of FIG. 4;

FIG. 6 is a detail view in vertical section of a portion of a carbon black reactor including an internally fired cylindrical burner according to this invention;

FIG. 7 is an end elevational view of the burner of FIG. 6;

FIG. 12 is a view in vertical section of a carbon black reactor incorporating a burner made in accordance with the present invention;

FIG. 13 is an elevational view taken along line 13-13 of FIG. 12 showing details of the flat bulkhead burner construction;

FIG. 14 is an enlarged detail view in cross-section taken along line 14—14 of FIG. 13 and illustrating the hollow construction of the bars comprising the flame holder;

DESCRIPTION OF THE PREFERRED EMBODIMENTS

Figure 8:
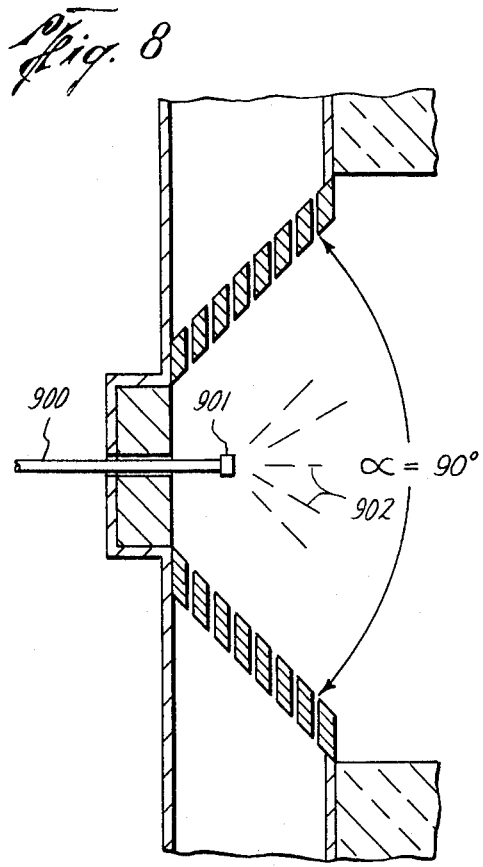
FIG. 8 is a detailed view in vertical section of a carbon black reactor including an internally fired concave conical burner according to this invention.

In the various embodiments of the invention, means for mixing gaseous fuel and oxidant gas, or for finely atomizing a liquid fuel and mixing it with oxidant gas, will of convenience be placed upstream of the burner. Many types of such means are known and used in the art. However, the present invention is more particularly concerned with the orifice-flameholder portion of the burner and specifically with the formation of elongated parallel orifices (straight or curved) for optimum combustion characteristics.

The combustion-recirculation pattern of the burner of the present invention is illustrated in FIGS. 1 and 2. Elongated non-streamlined bodies 116, in the shape of square-cornered bars, are arranged so as to form parallel slots 117 across the end of duct 118 through which a premix of fluid fuel and oxidant gas is flowing. The premix flowing through the slots 117 forms recirculation patterns represented by lines 119. For maximum combustion intensity, the width of the slots, which is adjustable by changing the size of the spacers 120 between the non-streamlined bodies 116 may be varied. The width of the non-streamlined bodies is chosen so that there is no waste space between the adjacent recirculation patterns represented by the lines 119, and minimal interference between adjacent recirculation patterns, the two adjacent down-flow streams being virtually tangent, as illustrated in FIG. 2.

In FIG. 3 is illustrated the mechanism by which it is believed that burners according to the present invention produce particularly advantageous stable flame holding and combustion. Shown in substantially enlarged cross sectional detail in FIG. 3 are three of the flame holder bars 116 of FIG. 1 and two of the slots of orifices 117 formed by the spaced parallel bars 116. The combustible mixture of gas and air flows from a plenum 121 through the orifices 117 and exits downstream of the flame holder as a plurality of spaced parallel jets 122 which are then rapidly combusted. As illustrated, it is believed that the combustion takes place in essentially two zones designated in FIG. 3 as zone A and zone B. As the parallel jets or streams 122 of air-fuel mixture issue from the orifices 117, surrounding gases are drawn into each jet at its base. Because of the adjacency of the jets, the only place from which the entrained gases can come is the downstream sides of the jets which at that point are undergoing intense combustion. Thus, high-temperature masses of combustion products are continually entrained in both sides at the base of each jet to supply heat and initiate combustion of the incoming fuel mixture.

It has been found experimentally that by varying the ratio of jet width to jet spacing, the degree of recirculation may be varied. In FIG. 3, the slot or orifice width (which is also the jet width) is represented by "S"; and the pitch, or centerline to centerline spacing of the jets or slots by "P". To maximize combustion intensity, the slot-pitch ratio is adjusted to provide a recirculation sufficient to heat and ignite the incoming combustible mixture, but not so great as to lower the initial reaction intensity by excessive dilution of the incoming premix by recirculated gases. Generally, by reducing the bar width "B", but maintaining a constant slot-pitch ratio the resulting flame height will be decreased.

Further observations have shown that with a cylindrically formed, internally fired, burner shape, discussed more fully hereinafter, the slot-pitch ratio must be decreased with increased curvature of the slotted wall. This is believed to be required to compensate for the rapid reduction in volume available for the combustion as the flame advances radially toward the axis of the cylinder.

For other burner configurations possible with this invention, the slot-pitch ratio will generally require reduction with increasing concavity and increase with increasing convexity relative to the flat burner case.

The practical range of throughput of a burner according to this invention is quite broad, having a turndown ratio of at least 7 to 1 for a stoichiometric natural gas/air mixture. Turndown ratio is the ratio of highest to lowest throughout volumes of fuel-air mixtures which can be used while maintaining a suitable flame.

It has been found experimentally that a slot velocity in the range of 100 to 150 fps, for the incoming premix, may be used for a first burner design approximation. If the aggregate slot area is taken to produce a slot velocity in this range and the slot-pitch ratio is appropriate for the flame holder surface shape, a stable operating prototype burner may be constructed. Thereafter the adjustment of slot-pitch ratio to the requirements of a given case can be done by one skilled in the art of combustion in carbon black manufacture.

The preferred arrangement for best recirculation is to assemble the flame holder with bars or other elements having sharp corners to form sharp-edged orifices in the downstream flow direction. Rounded corners, found with so-called square tubing available commercially, or even round bars or tubes, will work, but with noticeably less stability. FIG. 3 shows a typically preferred arrangement with square corners 116a forming the orifices of the slots. If desired, specifically shaped bars could be designed to augment jet entrainment. For instance, the downstream bar face might be concaved to permit a better approach angle of the recirculation masses. Also, the upstream slot edges could be rounded to reduce entrance losses and eliminate eddies that might persist through the slot into the jet.

EXAMPLE 1

FIG. 4 is a vertical cross sectional view of an experimental burner 300 built according to this invention in which the flame holder surface 302, rather than being flat, is the interior perimeter of a cylinder 304 formed by 19 steel rings 306 spaced 0.014" apart along a common axis. The rings are ordinary steel cut washers stamped from ¼" plate with the inside diameters turned to 3.0" to make the inside edges flat, perpendicular to the washer sides, and form uniformly square corners 306a.

The slot spacing was achieved by symmetrically placing 6 triangular shims 308 cut from 0.014" thick steel sheet as the washer rings were stacked. The washer and shim assembly was fastened together by welding, running a continuous bead of weld metal along the outside stack surface at the radial center of each row of shims.

In operation a premix flow 310 of air and natural gas flows into a burner housing 312 through port 314, into plenum 316 and through the slots 318 formed by the rings 306 and issues radially inwardly into the combustion-reaction zone 328. Combustion is held against the inside wall of the cylindrical chamber formed by the spaced assembly of rings 306. The reaction proceeds through zone 328 as delineated in the discussion of FIG. 3.

Hot combustion products 320 flow radially toward the axis of the chamber and, by continuity, are turned to an axial velocity toward the chamber exit. The upstream end of the cylindrical chamber is closed, requiring all the combustion products to exhaust through the downstream end of the chamber which is open.

In operation of this burner, the reaction zone 328 may be clearly seen by sighting upstream along the axis into the cylindrical chamber from a position beyond the discharge nozzle of housing 312. Zone 328 appears as a brightly luminescent thick-walled cylinder having a well-defined core of exhausting gases and an outside diameter equal to the inside diameter of the rings 306.

The axial exhaust core is appreciably darker in luminescence than zone 328 which suggests that combustion is virtually completed within zone 328.

It is apparent, by visualizing the flow paths of the combustible mixture in the FIG. 4 arrangement, that the steel surfaces exposed to the heat radiation from the reaction zone 328 are cooled by the lower temperature mixture flowing over immediately adjacent surfaces. The inner faces of the rings 306 are exposed to the full amount of heat from the reaction but remain undamaged because the heat, conducted through the steel ring to the sides, is removed rapidly enough by the premix flow to prevent damaging temperatures to be reached.

This heat exchanging system was found to work well enough to prevent burning or any discernible oxidation of the ring faces while operating at any air/fuel ratio with up to 600° of premix preheat. It has been found, for example, that stainless steel is satisfactory for prolonged use under carbon black manufacturing conditions.

The burner configuration of FIG. 4 demonstrates the form flexibility readily possible with a flame holder constructed in accordance with this invention.

EXAMPLE 2

As shown below, the practical range of throughput of a burner according to this invention is quite broad, having a turndown ratio of more than 7 to 1 at a stoichiometric natural gas/air mixture. A cylindrical form of this burner of the general type shown in FIG. 4, but measuring three inches in side diameter by five inches long with S=0.014", B=0.245", slot/pitch=0.054 and having 20 slots, was operated at flow rates of 2000 scfh air to 14,000 scfh air within the air/fuel ratio limits shown in TABLE I.

TABLE I

| Air Rate scfh | Blowoff Limits Lean* | Blowoff Limits Rich* | Pressure Drop psi** | Average Slot Velocity fps | Combustion Intensity*** Btu/hr/ft$^3$ |
|---|---|---|---|---|---|
| 2000 | 20.0 | 6.3 | 0.44 | 33 | $6.4 \times 10^6$ |
| 4000 | 17.4 | 7.5 | 1.07 | 67 | $13.2 \times 10^6$ |
| 6000 | 15.6 | 7.8 | 1.70 | 100 | $19.4 \times 10^6$ |
| 8000 | 13.6 | 8.7 | 2.28 | 133 | $24.4 \times 10^6$ |
| 10000 | 12.8 | 9.1 | 3.01 | 168 | $28.3 \times 10^6$ |
| 12000 | 12.4 | 9.4 | 3.75 | 200 | $33.8 \times 10^6$ |
| 14000 | 11.6 | 9.6 | 4.43 | 232 | $37.5 \times 10^6$ |

*Air volume/fuel gas volume with 10.5/1 stoichiometric A/F Ratio.
**Plenum to atmosphere.
***Combustion intensity was calculated using the burner chamber volume, plus the volume of the exhaust flame tongue to the extent of discernible luminosity.

These data demonstrate a highly versatile burner with a wide variation between the lean and rich blow-off points for a given air rate. While the data show a converging of the lean and rich blow-off limits as velocity of the premix increases, this is typical of high intensity burners. However, even at the slot velocity of 232 feet/second, the two blow-off ratios are two points apart.

EXAMPLE 3

Velocity of the combustion products 320 exiting from the FIG. 4 burner is a function of the length to inside diameter ratio of the burner, since all products of combustion must exit through the same area. A burner of the type of FIG. 4 was modified by changing the number of washers used as non-streamlined bodies so that the length to diameter ratio was set at 1.5, 2.5, and 3.5. Inside diameter was always 1.875". Two values of slot width were used for each length to diameter ratio, 0.010" and 0.015". The air/fuel ratios at lean blow-off and at rich blow-off were recorded. The difference between the two ratios at blow-off is a good measure of the stability of the system at a given slot velocity. These differences, the average slot velocity for the two blow-off conditions, and the slot width are recorded in TABLE II for each of the various models, the slot velocity of a model being varied by changing the loading in standard cubic feet per hour.

TABLE II

| Internal Length to Diameter Ratio | Ratio of Total Length of Periphery, Inches to Slot Area, Square Inches | Average Velocity in Slots Ft./Sec. | Air/Fuel, Lean Blow-Off Minus Air/Fuel, Rich Blow-Off |
|---|---|---|---|
| 1.5 | 188.3 | 180 | 8.8 |
| 1.5 | 188.3 | 355 | 4.5 |
| 1.5 | 125.5 | 119 | 7.0 |
| 1.5 | 125.5 | 235 | 4.0 |
| 2.5 | 192.6 | 225 | 7.5 |
| 2.5 | 192.6 | 337 | 5.6 |
| 2.5 | 192.6 | 450 | 3.7 |
| 2.5 | 128.2 | 156 | 6.3 |
| 2.5 | 128.2 | 235 | 5.6 |
| 2.5 | 128.2 | 305 | 4.3 |
| 3.5 | 194.7 | 160 | 10.4 |
| 3.5 | 194.7 | 240 | 8.0 |
| 3.5 | 194.7 | 320 | 6.3 |
| 3.5 | 129.7 | 110 | 8.2 |
| 3.5 | 129.7 | 164 | 7.1 |
| 3.5 | 129.7 | 218 | 5.5 |

Figure 18:
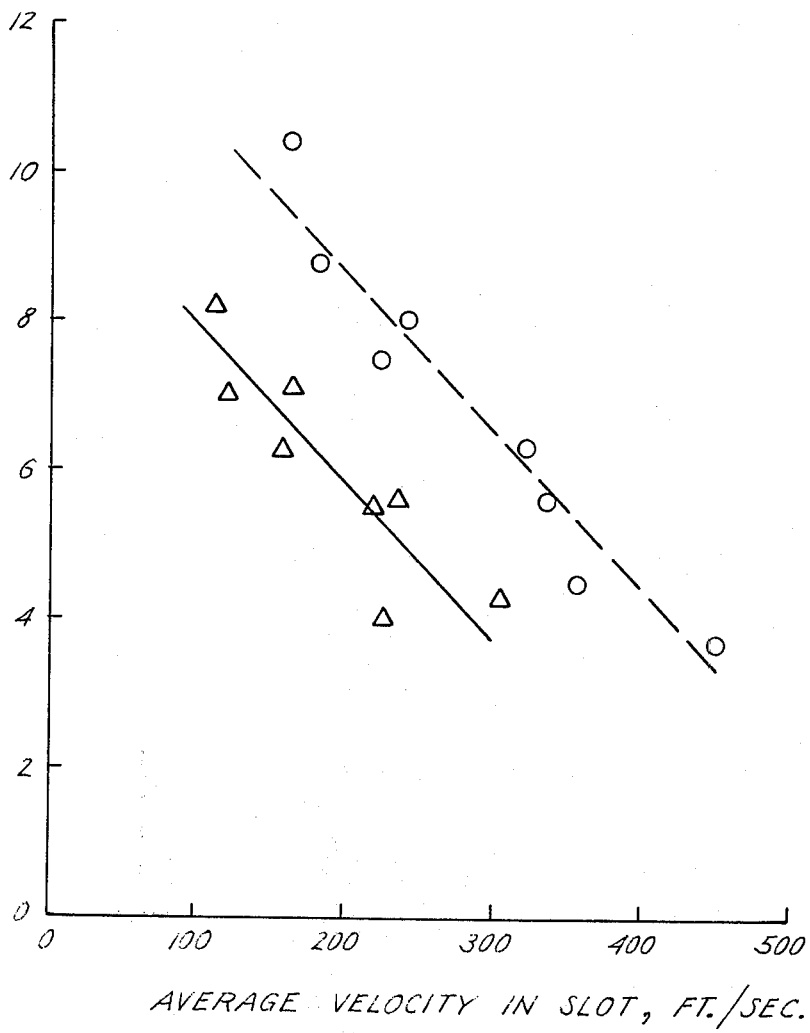
FIG. 18 is a plot of data showing how the air/fuel ratios at lean and rich blow-off are affected by velocity and by the ratio of length of periphery to slot area in the burners of the present invention.

FIG. 18 presents graphically the data of Table II. The graph indicates that at lower ratios of periphery length/slot area, the range of air/fuel ratios which are burned with a stable frame is narrowed.

It will be apparent to those skilled in the art that no set prescription for pitch, slot width, and ratio of slot width to pitch, is possible for applying to all cases. Variations in the parameters of combustion, such as preheat, type of fluid fuel, richness of mixture with respect to fuel, the oxygen content of the oxidant gas, and the like, as discussed, will influence the arrangements necessary, which can be readily adjusted in the apparatus and method of the invention. Also, at times it is desirable to have less than maximum intensity of combustion, depending upon the demands of the application of the process. The apparatus may be readily adjusted to meet such demands.

It has been found also that the geometric shape of the burner can to a degree affect the slot to pitch ratio which is optimum or practical with a given fuel. For example, a cylindrical burner with a length to internal diameter ratio of 1.81 was found to operate with stable flame while burning a 1050 BTU/ft$^3$ natural gas at slot to pitch ratios ranging from 0.054 to 0.119. A flat slotted burner on the other hand, was tested with the same fuel and produced optimum combustion at a slot to pitch ratio of 0.17 with instability setting in below 0.09 on the low side and above 0.25 on the high side. The conical burner used to produce the carbon black of samples 1 through 4 of Table III was successfully operated at a slot to pitch ratio as low at 0.0329.

Figure 10:
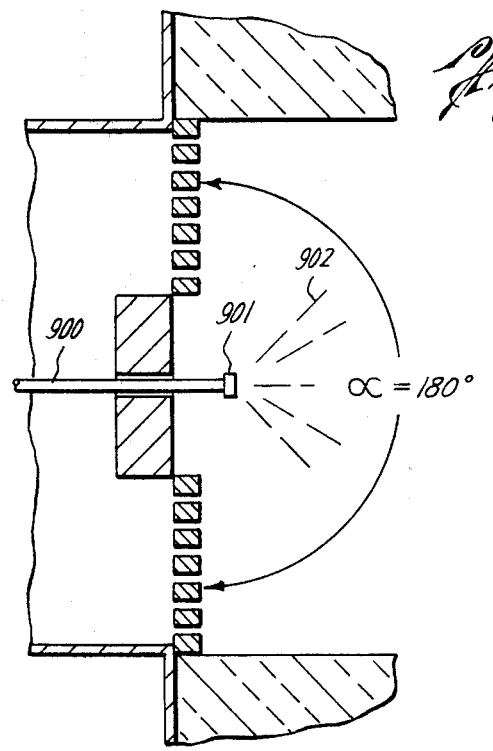
FIG. 10 is a detail view in vertical section of a portion of a carbon black reactor having a flat burner made in accordance with this invention.

In FIGS. 6, 8 and 10, are shown burners according to the present invention as they would be used in carbon black reactors. An oil feedstock pipe 900 conducts the feedstock to the center of the burner, and the oil is atomized by a nozzle 901 to form the mist of droplets 902. The burner flame would in each case develop as hereinbefore explained, but is omitted in these drawings for sake of simplicity.

Figure 9:
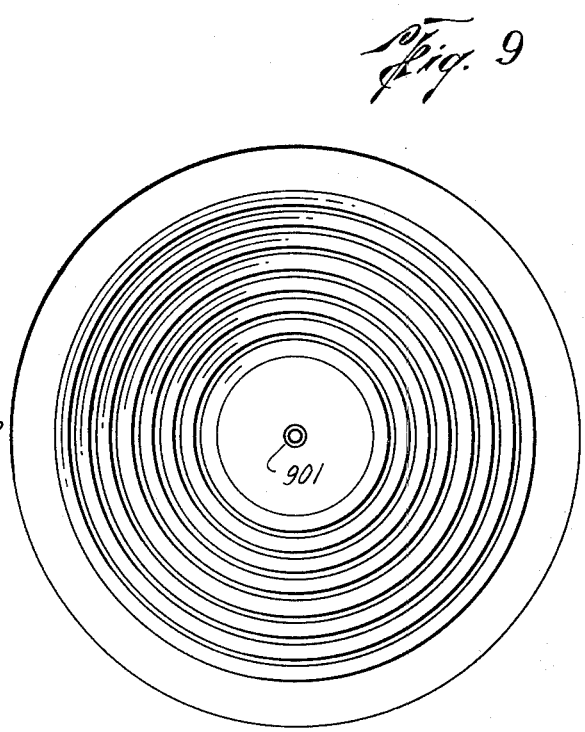
FIG. 9 is an end elevational view of the burner of FIG. 8.
Figure 11:
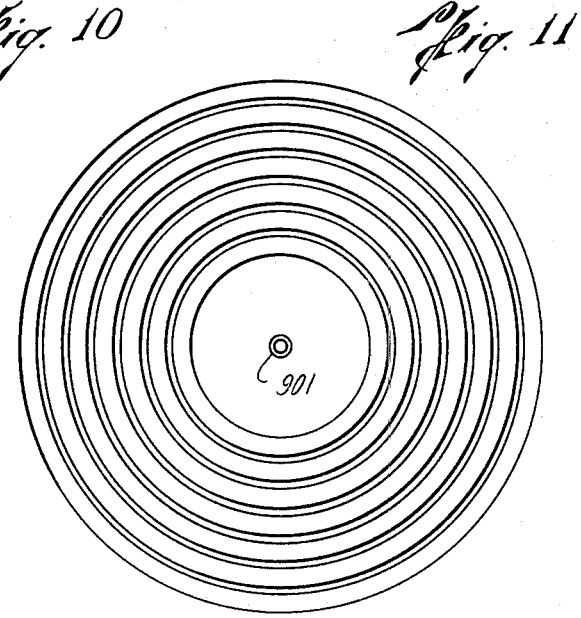
FIG. 11 is an end elevational view of the burner of FIG. 10.

In FIGS. 6 and 7 the opposite sides of the cylinder are parallel, making an angle alpha between opposite sides of zero. In FIG. 8 and FIG. 9, the angle of the burner is 90 degrees; in FIG. 10 and FIG. 11, the angle is 180 degrees. As the angle increases, the feedstock hydrocarbon droplets are subjected to progressively less and less intense heat and turbulence, and as a result progressively coarser blacks would tend to be produced. The angle may have any value between those shown, or even greater than 180 degrees.

FIGS. 12, 13 and 14 illustrate the use of a flat bulkhead type of burner made according to the present invention in conjunction with the other parts of a carbon black reactor 600. A steel shell 602 lined with refractory 604 forms a reactor body to which the flame-holder 606 is fitted. Premix 608 enters plenum 610 through inlet 612, flows through the slots 614 between bars 616 comprising the flame holder 606 and burns downstream of the flame holder in zone A. The flame is spread over the cross-section of the reaction chamber 636, so that feedstock hydrocarbon entering the reactor through supply pipe 618 and atomized by nozzle 620 to form a mist of droplets 622, is not subject to the immediate intensity of the total combustion, and the velocity of the combustion gases downstream of the burner must be relatively low because the flow is spread across the width of the chamber 636, which has no constriction to increase velocity.

Such an assembly of reactor and burner would be adapted to produce the coarser grades of carbon black commonly known as "carcass grades". A preferred, but optional, feature shown is the use of hollow bars 616 for the flame holder 606, so that a portion of the premix, or of the gaseous fuel, may be used to cool the hollow bars 616. Of course, this feature may be used in connection with any assembly of burner or burner and reactor according to this invention.

The hot gases of combustion from zone A entrain the droplets 622 of hydrocarbon feedstock so that the heat in the combustion gases causes the feedstock to be thermally converted to carbon black, which is borne by the gases down the reactor to a quench zone B where atomized water 624 issuing from nozzle 626 to which it is supplied by supply pipe 628 reduces the temperature of the gases and carbon black to a level such that the reactions are stopped, and the carbon black may be collected by any conventional collecting equipment, not shown, to which it passes through outlet 630.

Figure 15:
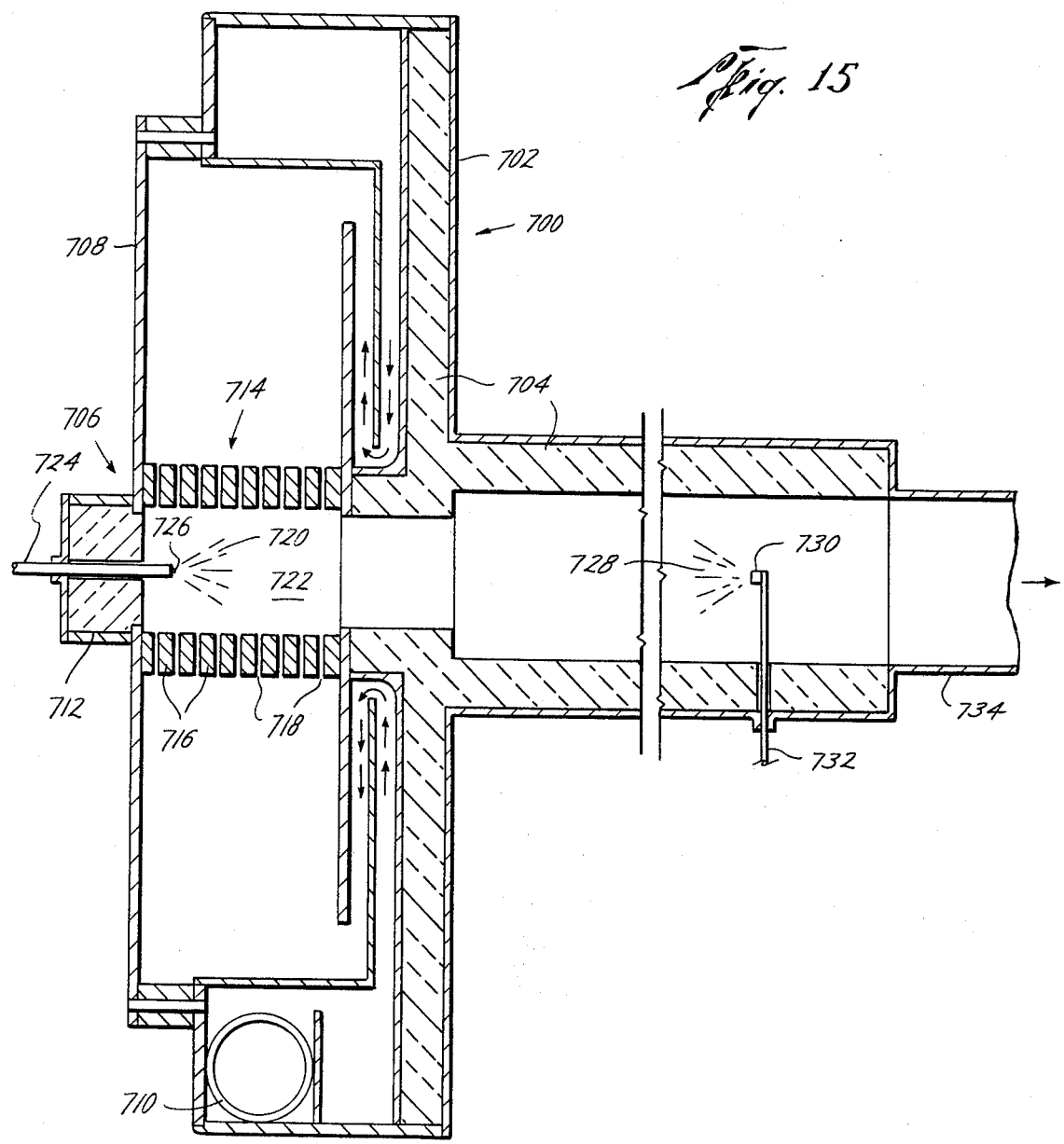
FIG. 15 is a view in horizontal cross-section of a cylindrical burner according to the present invention incorporated in a carbon black reactor.

FIG. 15 represents an alternate burner and reactor assembly 700 for the production of the finer, or tread grades of carbon black. The reactor shell 702, a steel cylinder, is lined with refractory 704. A burner assembly 706 consisting of a premix plenum housed in shell 708 with entry pipe 710, closure means 712, and cylindrical flame holder 714 consisting of a series of flat annular shapes as non-streamlined bodies 716 spaced apart so as to form slots or elongated orifices 718, is fitted to the reactor. Feedstock hydrocarbon 720 is fed into the space 722 within the cylindrical flame holder 714 through supply pipe 724 and is atomized by nozzle 726. Alternatively, vaporized oil may be introduced through pipe 724. The feedstock oil is surrounded by intense combustion and turbulence as shown and discussed in connection with the FIG. 4 burner, so that the hydrocarbon feedstock is reacted to form carbon black of small particle size and high structure, as hereinbefore defined. The hot gases of combustion entraining the carbon black so formed are carried to the point of injection of quench water mist 728 atomized by water nozzle 730 supplied by pipe 732, to be cooled to a temperature at which reactions are stopped, and the carbon black may be separated and collected by any conventional means, to which the gases and carbon black flow through outlet 734.

Figure 16:
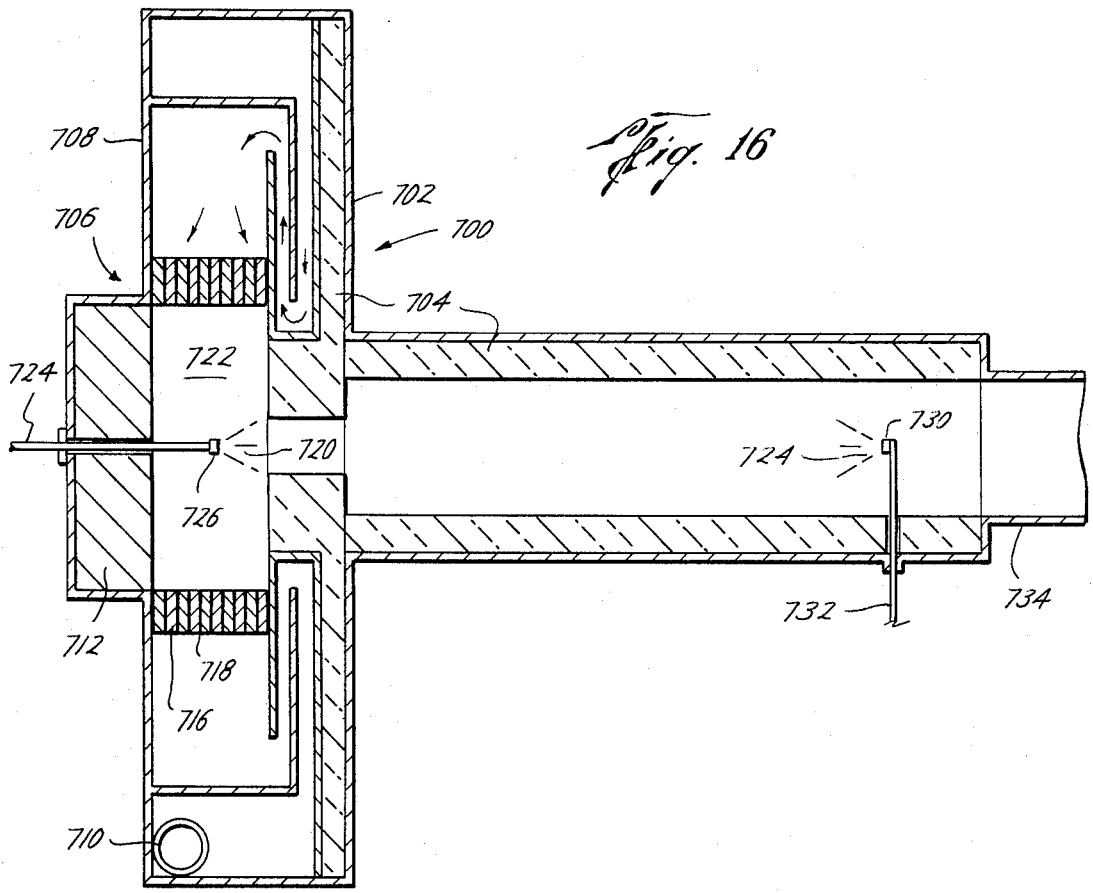
FIG. 16 is a view in horizontal cross-section of a carbon black reactor with a flow constriction incorporating a cylindrical burner according to this invention.

FIG. 16 represents a carbon black reactor fitted with a cylindrical burner of this invention, similar to that of FIG. 15, but with a burner of lesser length to diameter ratio and a narrower constriction downstream of the burner. Corresponding identification numbers in FIGS. 15 and 16 represent corresponding parts with corresponding functions.

Figure 17:
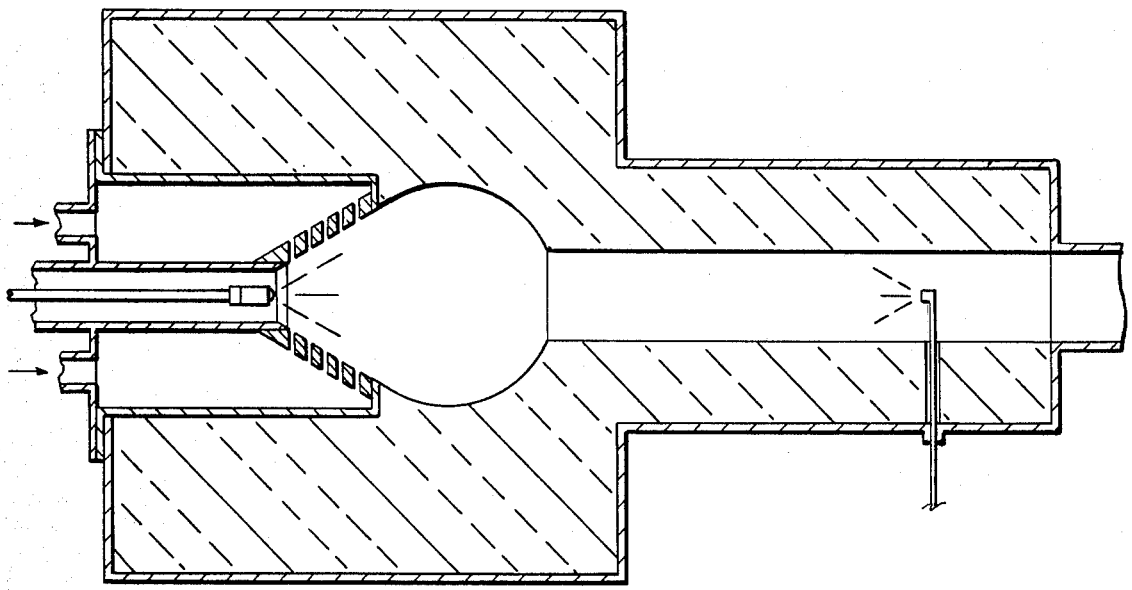
FIG. 17 is a view in horizontal section of yet another carbon black reactor incorporating an internally fired conical burner constructed in accordance with this invention.

FIG. 17 illustrates a reactor fitted with a burner of this invention made in the form of a sixty degree cone, internally fired.

FIG. 18 is a plot showing the relationships among average slot velocity, the ratio of length of periphery to slot area, and blow-off characteristics for a burner of this invention.

Figure 19:
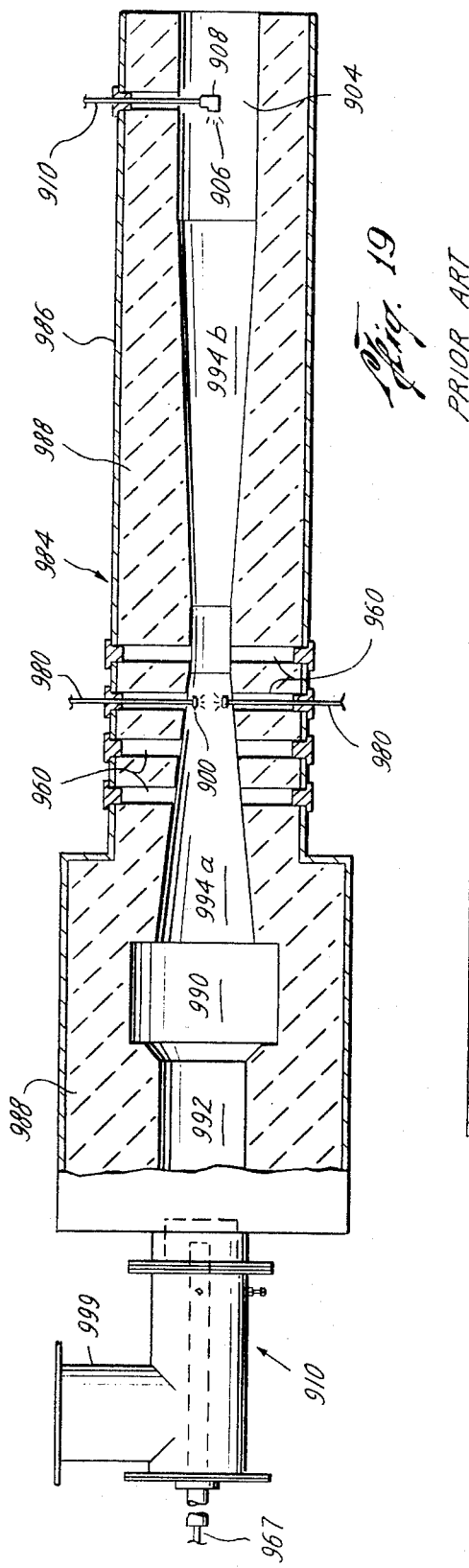
FIG. 19 is a view in horizontal cross-section of a prior art carbon black reactor to which the reactor of the present invention is compared.
Figure 20:
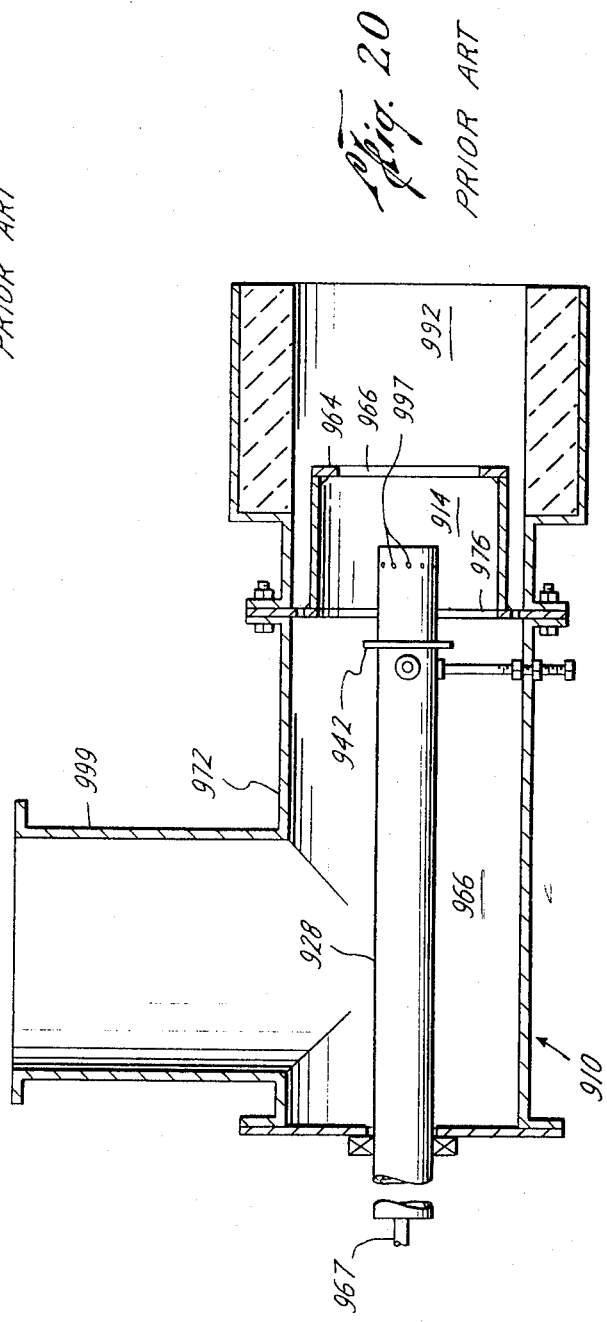
FIG. 20 is an enlarged detail view of the burner section of the carbon black reactor of FIG. 19.

FIGS. 19 and 20 present structural details of one apparatus of the prior art to which the present invention is compared.

TABLE III: Carbon black was made on burner-reactor assemblies in accordance with FIGS. 15, 16 and 17 and tested, to determine physical and chemical properties. Some blacks were tested in sectional retreaded tires to determine roadwear characteristics. Test results are given in TABLE III. Samples No. 1 through 4 were produced in an assembly according to FIG. 17; sample 5 was produced in an assembly according to FIG. 15; and samples 6 through 13 were produced in an assembly according to FIG. 16.

Road testing of the tires was done in the manner familiar to those in the industry. The same standard carbon black was used in the rubber treads in each test, so that the wear rate of the compounds containing different blacks could be compared on a common basis. The wear rating of the standard in each case was set at 100%; values of more than 100% indicate roadwear superior to the standard for abrasion in use, and values less than 100% indicate roadwear inferior to the standard.

The standard reference carbon black was an Intermediate Super-Abrasion Furnace black, with the following properties:

| | |
|---|---|
| Dibutyl Phthalate Absorption Number (cc/100g) | 117 |
| 24M4 DBPA Number (cc/100g) | 104 |
| Iodine Absorption Number, ASTM (mg/gm) | 120 |
| Nitrogen Surface Area (M²/g) | 135 |
| Surface Area by CTAB (M²/g) | 116 |
| Tint Strength, ASTM (% 1RD#3) | 113 |

The rubber formula used in the tread compound for each carbon black was as follows, the numbers representing parts by weight:

| | |
|---|---|
| SBR 1714 | 97.5 |
| CB 441[a] | 48.17 |
| Carbon Black | 70.0 |
| 78 Zinc Oxide[b] | 3.0 |
| Stearic Acid | 2.0 |
| Wingstay 100[c] | 1.0 |
| Santocure[d] | 1.2 |
| Diphenylguanidine | 0.1 |
| Sulfur | 1.8 |

[a]37.5 parts oil/100 parts polybutadiene rubber, supplied by Goodrich Chemical Co.
[b]Trademark for zinc oxide made by the French process, furnished by New Jersey Zinc Co.
[c]Derivative of paraphenylenediamine in flaked form supplied by the Chemical Division, Goodyear Tire & Rubber Company used as anti-oxidant.
[d]Curing agent, N-Cyclohexyl-2-benzothiothiazolesulfenamide, supplied by the Monsanto Company.

TABLE III

| | Product Test Data | | | | | | | Reactor Data | | | Burner Data | | |
|---|---|---|---|---|---|---|---|---|---|---|---|---|---|
| Sample No. | Road-Wear Rating % | DBP | 24M4 DBP | ASTM Iodine | Nitrogen Surface Area | CTAB Surface Area | ASTM Tint Strength | Throat Diameter | Throat Length (Inches) | Tunnel Diameter | Slot Width | Slot to Pitch Ratio | Ratio of Slot Periphery to Slot Area |
| 1 | — | 154 | — | — | — | — | 105 | None | — | 4.785" | 0.017" | .0329 | 100.9 |
| 2 | — | 158 | — | 161 | — | — | 96 | None | — | 4.785" | 0.017" | .0329 | 100.9 |
| 3 | — | 200 | — | 80 | — | — | 89 | None | — | 4.785" | 0.017" | .0329 | 100.9 |
| 4 | — | 185 | — | 70 | — | — | 82 | None | — | 4.785" | 0.017" | .0329 | 100.9 |
| 5 | 108 | 138 | 97 | 100 | 110 | 106 | 120 | 2.5" | 2.0" | 3.0" | 0.015" | .0577 | 126.67 |
| 6 | 104 | 112 | 96 | 121 | 129 | 122 | 124 | None | — | 3.75" | 0.025" | .0909 | 78.83 |
| 7 | 107 | 116 | 99 | 125 | 169 | 151 | 129 | 3.0" | 2.25" | 3.75" | 0.025" | .0909 | 78.83 |
| 8 | 109 | 118 | 98 | 145 | 159 | 144 | 130 | 3.0" | 2.25" | 3.75" | 0.025" | .0909 | 78.83 |
| 9 | 103 | 116 | 97 | 134 | 155 | 147 | 129 | 3.0" | 2.25" | 3.73" | 0.025" | .0909 | 78.83 |
| 10 | 109 | 136 | 98 | 128 | 154 | 142 | 130 | 3.0" | 2.25" | 3.75" | 0.025" | .0909 | 78.83 |

TABLE III-continued

| | Product Test Data | | | | | | Reactor Data | | | Burner Data | | |
|---|---|---|---|---|---|---|---|---|---|---|---|---|
| Sample No. | Road-Wear Rating % | DBP | 24M4 DBP | ASTM Iodine | Nitrogen Surface Area | CTAB Surface Area | ASTM Tint Strength | Throat Diameter | Throat Length (Inches) | Tunnel Diameter | Slot Width | Slot to Pitch Ratio | Ratio of Slot Periphery to Slot Area |
| 11 | 110 | 141 | 99 | 136 | 156 | 143 | 131 | 3.0" | 2.25" | 3.75" | 0.025" | .0909 | 78.83 |
| 12 | 109 | 144 | 104 | 115 | 148 | 137 | 130 | 3.0" | 2.25" | 3.75" | 0.025" | .0909 | 78.83 |
| 13 | 115 | 150 | 101 | 135 | 158 | 144 | 135 | 3.0" | 2.25" | 3.75" | 0.025" | .0909 | 78.83 |
| 14 | 113 | 150 | 100 | 124 | 150 | 138 | 133 | 3.0" | 2.25" | 3.75" | 0.025" | .0909 | 78.83 |
| 15 | 115 | 149 | 98 | 117 | 142 | 134 | 133 | 3.0" | 2.25" | 3.75" | 0.025" | .0909 | 78.83 |
| 16 | 110 | 148 | 100 | 114 | 129 | 121 | 131 | 3.0" | 2.25" | 3.75" | 0.025" | .0909 | 78.83 |
| 17 | 96 | 136 | 94 | 85 | 94 | 94 | 110 | 3.0" | 2.25" | 3.75" | 0.025" | .0909 | 78.83 |
| 18 | 116 | 139 | 97 | 148 | 164 | 148 | 133 | 3.0" | 2.25" | 3.75" | 0.025" | .0909 | 78.83 |
| 19 | 103 | 139 | 96 | 96 | 100 | 99 | 117 | 3.0" | 2.25" | 3.75" | 0.025" | .0909 | 78.83 |
| 20 | 110 | 117 | 100 | 122 | 135 | 129 | 129 | 3.0" | 2.25" | 3.75" | 0.025" | .0909 | 78.83 |
| 21 | — | 138 | 96 | 104 | — | — | 116 | 3.0" | 2.25" | 3.75" | 0.025" | .0909 | 78.83 |
| 22 | — | 145 | 102 | 96 | — | — | 117 | 3.0" | 2.25" | 3.75" | 0.025" | .0909 | 78.83 |
| 23 | — | 144 | 100 | 80 | — | — | 109 | 3.0" | 2.25" | 3.75" | 0.025" | .0909 | 78.83 |
| 24 | — | 147 | — | 127 | — | — | 131 | 3.0" | 2.25" | 3.75" | 0.025" | .0909 | 78.83 |
| 25 | — | 143 | — | 110 | — | — | 123 | 3.0" | 2.25" | 3.75" | 0.025" | .0909 | 78.83 |
| 26 | — | 148 | — | 188 | — | — | 141 | 3.0" | 2.25" | 3.75" | 0.025" | .0909 | 78.83 |
| 27 | — | — | 105 | — | 187 | 163 | 140 | 3.0" | 2.25" | 3.75" | 0.025" | .0909 | 78.83 |
| 28 | — | 161 | 103 | 148 | 169 | 154 | 137 | 3.0" | 2.25" | 3.75" | 0.025" | .0909 | 78.83 |
| 29 | — | 154 | — | 270 | 258 | 196 | 143 | 3.0" | 2.25" | 3.75" | 0.025" | .0909 | 78.83 |
| 30 | — | 153 | — | 255 | 239 | 189 | 142 | 3.0" | 2.25" | 3.75" | 0.025" | .0909 | 78.83 |
| 31 | — | 153 | — | 259 | 253 | 189 | 144 | 3.0" | 2.25" | 3.75" | 0.025" | .0909 | 78.83 |

Referring now to TABLE III, data on road testing of tire treads made with 16 carbon blacks in accordance with the present invention are presented, with the laboratory test data and burner and reactor data. The "wear rating" listed, and as hereinbefore explained, is expressed in terms of percent of the standard. The lowest rating is 96% for sample 17, which has an Iodine Number of 85, that is in the range of typical high abrasion furnace type carbon black, to a high of 116% for sample 18, with an Iodine Number of 148. A black of the fineness level of high abrasion furnace grade carbon black ordinarily has a wear rating of about 80% to 88% of the standard. Therefore, even the lowest wear rate experienced is surprisingly high considering the fineness of the carbon black product. Included also are data from laboratory tests of 15 samples not road tested.

Of special interest is the series represented by samples 10 through 16. The oil rate variation was held to about 3%, and air rate held constant. The gas rate was varied to give air/fuel ratios of 16.0, 15.0, 14.0, 13.0, 12.0, 11.0, and 10.0, with a fuel gas having a stoichiometric ratio of 10.5. In the ordinary case with conventional methods of manufacturing carbon black, increasing the gas rate over this wide range would require a significant reduction in oil rate to maintain the same level of tint, that is, at constant oil and air rate; tint is expected to decrease with decreasing air/fuel ratio, or increase in fuel gas. The tint in the run below stoichiometric ratio is the same as that for 16.0, 15.0, and 14.0 ratio. The middle of the series exhibits a slight rise in tint. From the DBP absorption figures and the 24M4 DBP absorption figures, another good but unexpected result appears. With conventional carbon black reactors, a decrease in air/fuel ratio of the magnitude shown here without a reduction in oil rate tends to result in a decline in both these values; but with the apparatus and process of this invention, no significant drop in structure or tint is observed between a 16.0 air/fuel ratio and a 10.0 air/fuel ratio and constant oil rate. This difference defines a new process. With the retention of great fineness and structure in spite of the increase of gas rate at constant oil rate, there is yet another advantage: the porosity of the product is decreased at the lowest air/fuel ratios (increased gas rates). A measure of porosity is the difference between the nitrogen surface area and the CTAB surface area:

| Air/Fuel Ratio | Measure of Porosity |
|---|---|
| 16 | 12 |
| 15 | 13 |
| 14 | 11 |
| 13 | 14 |
| 12 | 12 |
| 11 | 8 |
| 10 | 8 |

The versatility of the apparatus and process may be further illustrated by its ability to produce very high surface area blacks for pigment use in inks, paints or lacquers. Such blacks may be permitted to have high porosity, in contrast to blacks for use in rubber. High tint, which indicates high covering power, is desired in such blacks for non-rubber uses. Samples 26, 27, 29, and 31 show tints of 140 or higher, without loss of structure.

Samples 1 through 4 represent the product of a 64° conical burner, of the type shown in FIGS. 8 and 9, in which, as explained, the feedstock is not subjected to as great intensity of heat and turbulence as in a cylindrical burner. At air/oil ratios from 778 to 1167 scfh air per gallon of oil, this burner-reactor did not produce the high fineness of the cylindrical models at comparable air/oil ratios, thus illustrating the effect of the angle alpha, as explained, and the versatility of the invention.

Yields from the apparatus and process of this invention have been superior. A commercial carbon black made on apparatus like that shown in U.S. Pat. No. 3,290,120 to Wright et al, essentially like sample 21 in properties, is produced at a yield of 4.30 pounds of carbon black per gallon of oil, compared to a yield of 4.65 for sample 21, using the same feedstock oil. Another commercial carbon black produced on a venturi shaped reactor with an axial flow burner not of this invention, and at an air/oil ratio of 795, had a tint of 128, a DBP absorption of 128, iodine number of 120, and a yield of 3.80 pounds per gallon of oil, as compared to sample 18 produced by the apparatus and process of the present invention with a tint of 133, a DBP absorption of 139, an iodine number of 148, and a yield of 4.95 pounds per gallon of oil. While sample 18 was produced with an oil of higher aromaticity, experience has shown a yield difference between the oils of about 0.85 pounds per gallon, leaving an advantage of 0.30 pounds per gallon for sample 18 over the conventional burner and venturi reactor. In addition, the sample 18 is significantly finer than the commercial product; and increased fineness is ordinarily obtained at a cost of decreased yield.

The ability of the apparatus and process of the present invention to produce carbon black at higher yields than a conventional process depending primarily upon velocity for the production of fineness is illustrated in the example of Table IV. The conventional apparatus was a venturi-shaped reactor fitted with a gas burner fitted with a centrally located flow interrupter and a peripherally located flow interrupter as illustrated in prior art FIGS. 19 and 20. Referring to FIGS. 19 and 20, combustion air entered the burner assembly through pipe 999, flowed into plenum 966, thence past the centrally located flow interrupter 942, through opening 976 into the mixing space 914, where fuel gas supplied through pipes 967 and 928 was injected through orifices 997 into the air stream. The air stream, made turbulent by the centrally located flow interrupter 942, mixed with the fuel gas. The air and gas flowed through opening 966 past the peripherally located flow interrupter 964 which caused further turbulence and enhanced the degree of mixing. The fuel ignited in combustion tunnel 992, and combustion continued in combustion chamber 990. From the combustion chamber the hot products of combustion entered converging section 994a of reactor 984 consisting of metal shell 986, shaped refractory 988, and ancillary equipment. The hot gases of combustion passed downstream toward the feedstock injection tubes 960 in the refractory, through which oil supply pipe 980 passed to furnish oil to the atomizing nozzle 900, which injected the feedstock oil into the stream of hot gases. Thence the hot gases entraining the oil feedstock passed through the throat or constriction 905, into diverging section 994b and into cylindrical section 904. During the passage of the oil and hot gases downstream from the oil injection nozzles 900 carbon black and off gases were formed. The reactions were quenched in section 904 by a spray of water 906 atomized by nozzle 908 on water supply pipe 910. The apparatus of this invention was a slot burner with a slot to pitch ratio of 0.09 fitted to a reactor in all essentials like that shown in FIG. 15. The same quality of feedstock oil was used in each case.

It will be seen that at equal quality the conventional reactor requires more than twice as great a velocity as the apparatus and process of this invention and that the apparatus and process of this invention gives a yield of from 0.50 to 0.74 pounds of carbon per gallon of oil more than the conventional process. As discussed, the quality of the product from conventional processes depends heavily upon velocity.

The advantage in yield of this invention over the conventional practice may be placed in perspective by comparing the yields of ASTM grade N-339 from Table IV. The yield advantage of 0.50 pounds of carbon per gallon of oil for this invention, when the feed rate to one reactor is ordinarily about 300 gallons per hour of make oil, results in an increase of 150#/hr. or 3600#/day without increased oil usage. At the yield of 4.52#/gal. for conventional process, this amounts to saving 796 gallons of oil per day, or 247,101 gallons per year at an operating factor of 85% for the producing plant, for one reactor alone. A producing plant may have 10 or more reactors.

TABLE IV

|  | Conventional Apparatus & Process | | Apparatus & Process of This Invention | |
|---|---|---|---|---|
| ASTM Grade | N-339 | N-375 | N-339 | N-375 |
| Air/Gas Ratio, SCF/SCF | 14.6 | 15.9 | 15.1 | 15.3 |
| Air/Oil Ratio, SCF/Gallon | 681 | 702 | 553 | 567 |
| ASTM Tint | 107 | 115 | 111 | 113 |
| DBP | 135 | 128 | 143 | 143 |
| CATB Surface Area, M²/gm | 94 | 97 | 97 | 94 |
| Yield, pounds carbon/ gallon of oil | 4.2 | 4.23 | 5.02 | 4.99 |
| Relative Velocity | 577.6 | 579.8 | 209.4 | 209.5 |
| Yield Advantage, #C/gal. | — | — | 0.52 | 0.76 |

Another aspect of the invention is the fact that the feedstock oil may be injected within the burner, with good results. This is contrary to common experience with conventional burners and reactors. All samples in TABLES II and V were produced with oil injection within the burner. Thus, the conventional structures for separate zones of combustion such as seen in U.S. Pat. Nos. 3,490,869 and 3,290,120, are avoided by the invention.

EXAMPLE 4

A cylindrical burner was constructed according to the present invention, having the characteristics listed in TABLE V.

TABLE V

| Inside diameter | 19.125" |
|---|---|
| Length | 9.975" |
| Number of slots | 13 |
| Number of non-streamlined bodies (rings) | 12 |
| Slot periphery/slot area ratio | 24.6 |
| Slot width | 0.075" |

The burner was fitted on a carbon black reactor having a constriction measuring 11" diameter by 9" length adjacent to the burner and a 12" diameter tunnel. The apparatus was charged with feedstock having the characteristics shown in TABLE VI. Operating conditions of the reactor and data on the quality of the pelletized product are given in TABLE VII. Fuel was natural gas; oil feedstock was aromatic petroleum residual.

TABLE VI

| API Gravity at 60° F. | 0.2 |
|---|---|
| Carbon Content, % | 87.62 |
| Hydrogen Content, % | 7.70 |
| C/H Weight | 11.38 |
| C/H Atomic | 0.954 |
| Sulfur Content, % | 3.38 |
| Viscosity, SUS at 40° C. | 579 |
| at 100° C. | 588 |
| Ash Content, % | 0.01 |
| Sodium Content, ppm |  |
| Pentane Insolubles | 7.8 |
| BMCI | 124.9 |
| Distillation, 760 mmHg. |  |
| IBP |  |
| 5% Recovery, °F. | 499 |
| 10% Recovery, °F. | 524 |
| 20% Recovery, °F. | 584 |
| 30% Recovery, °F. | 639 |

TABLE VI-continued

| | |
|---|---|
| 40% Recovery, °F. | 694 |
| 50% Recovery, °F. | 747 |
| 60% Recovery, °F. | 828 |
| 70% Recovery, °F. | 973 |
| 80% Recovery, °F. | |
| End Point, °F. | 973 |
| Recovery, % | 80 |

The abrasion resistance of rubber compounds may be compared by laboratory abrasion testing. The compounds are formed into small wheels which are held against a rotating abrasive stone while they turn. Although the results of the laboratory abrasion tests are not as reliable as roadwear testing, they do give a good estimate since a similar roadwear rating can be expected. The carbon black of Example 4 was tested for abrasion resistance by the laboratory method, and compared to the standard ISAF black, rated 106%.

TABLE VII

| | |
|---|---|
| Constriction Diameter, inches | 11 |
| Air rate, MSCFH | 180 |
| Gas rate, MSCFH | 10.5 |
| Premix temperature, degrees F. | 300 |
| Feedstock oil, degrees API | 1.1 |
| % Carbon | 88.32 |
| Gallons per hour | 200 |
| Injection point, inches into burner from upstream wall of burner | 5 |
| Quench point, inches from burner | 111 |
| Dibutyl phthalate absorption number | 154 |
| 24M4 DBPA number | 116 |
| Iodine adsorption, ASTM | 134 |
| Tint, ASTM | 116 |
| Laboratory abrasion rating, % of ISAF standard | 106 |
| Yield, pounds of carbon black per gallon of oil | 3.57 |

The ability of the apparatus and process of the present invention to produce very fine, high surface area carbon blacks at velocities lower than those of conventional processes is illustrated by comparing the examples given with examples of conventional processes, as shown in TABLE VIII.

An approximate but practical method for comparing velocities is used, denoted "relative velocity". The total volume of the air and gas at air preheat temperature, in cubic feet/second is divided by the cross section area in square feet of the narrowest part of the reactor. It is assumed that the temperature rise of the combustion products, as modified by the injection of oil, will be reasonable comparable from case to case where oil/air ratios are comparable.

TABLE VIII

| | Carbon Black of Example 36, per this Invention | ISAF of Example 2 U.S.P. 3,490,869 |
|---|---|---|
| Relative velocity | 117 | 230 |
| ASTM Iodine adsorption | 134 | 115 |
| Air/Oil, scfh/gph | 900 | 877 |

The air/oil ratio, here expressed as cubic feet of air per gallon of oil, represents a dilution factor, being proportional to the ratio of oil to the volume of flowing gases. It is seen that the apparatus and process of the present invention produces a finer black (higher iodine adsorption) at comparable air/oil ratios, than the device and process of U.S. Pat. No. 3,490,869 and at about half the velocity. This great a difference defines a distinctly different process.

The basic difference of the process of the present invention from prior art with respect to response to velocity may be further illustrated by comparing Runs A and B of TABLE IX. Run A was made with a burner in all essentials like that shown in U.S. Pat. No. 3,060,003 to Williams. Run B was made with the burner and process of the present invention.

TABLE IX

| | Relative Velocity in Construction | Air/Oil Ratio | ASTM Tint | DBP |
|---|---|---|---|---|
| Run A | 619 | 720 | 114 | 142 |
| Run B | 208 | 610 | 116 | 138 |

The foregoing disclosure and description of the invention is illustrative only, and various changes in the size, shape, and materials of construction can be made within the scope of the appended claims without departing from the spirit of the invention. In particular, the configuration of that portion of the carbon black apparatus downstream of the burner may be varied without departing from this invention. Shapes with one or more constructions or throats may be used, or shapes of uniform diameter. Shapes with varying diameter, such as truncated cones in different combinations, or such shapes as those derived from conic sections, or other curves, may be used in conjunction with the burner and apparatus of this invention.

What is claimed is:

1. In a carbon black reactor of the type having a burner section for combusting a pre-mixture of fluid fuel and oxygen gas to create hot combustion gases within said reactor for thermally decomposing a hydrocarbon feedstock into carbon black and waste gas, the improvement which comprises:
   a flameholder in said burner section adapted to produce non-streamlined flow of said mixture of fluid fuel and oxygen gas therethrough, said flameholder comprising a plurality of non-streamlined bodies spaced substantially equidistant from each other to provide a plurality of elongated parallel orifices of approximately equal thicknesses; and
   plenum means for supplying said premixture of fluid fuel and oxygen gas through said elongated parallel orifices to produce parallel jets of said premixture for combustion.

2. The carbon black reactor according to claim 1 wherein said flame holder is flat.

3. The carbon black reactor according to claim 2 wherein said flame holder comprises a plurality of straight parallel bars disposed in a common plane and spaced from each other to provide said orifices.

4. The apparatus according to claim 1 wherein said flame holder comprises a plurality of annular rings of equal inside diameter, spaced from each other in parallel relationship along a common axis to provide said orifices.

5. The apparatus according to claim 1 wherein said flame holder comprises a plurality of annular rings of progressively increasing inside diameters, spaced from each other in parallel relationship along a common axis to provide a conical flame holder, with the spaced between adjacent rings providing said orifices.

6. A carbon black reactor comprising:
   a burner section;

said burner section including plenum means for supplying a mixture of fluid fuel and oxygen gas to flameholder means; and flameholder means for combusting said mixture of fluid fuel and oxygen gas, said flameholder means comprising a plurality of non-streamlined bodies spaced substantially equidistant from each other to provide a plurality of elongated parallel orifices of approximately equal thicknesses through which said mixture of fluid fuel and oxygen gas may issue as non-streamlined parallel jets of said mixture, for combustion into hot combustion product gases;

means for injecting a hydrocarbon feedstock into the hot combustion product gases for thermal decomposition into carbon black; and quench means for quenching said reaction.

7. The apparatus according to claim 6 wherein the ratio of the width of said orifices to the distance between the center lines of adjacent orifices is from about 0.03 to about 0.25.

8. The apparatus of claim 6 wherein the flameholder is of a cylindrical shape.

9. The apparatus according to claim 8 wherein the ratio of the width of said orifices to the distance between the center lines of adjacent orifices is from about 0.05 to about 0.12.

10. The apparatus according to claim 6 wherein the flameholder is flat.

11. The apparatus of claim 10 wherein the ratio of the orifices width to the distance between center lines of adjacent orifices is from about 0.09 to about 0.25.

12. The apparatus of claim 6 wherein the flameholder is conical.

13. The apparatus according to claim 6 wherein the ratio of the total peripheral length per orifice to the total cross-sectional area per orifice is from about 25 to 200.

* * * * *